Figure 1:
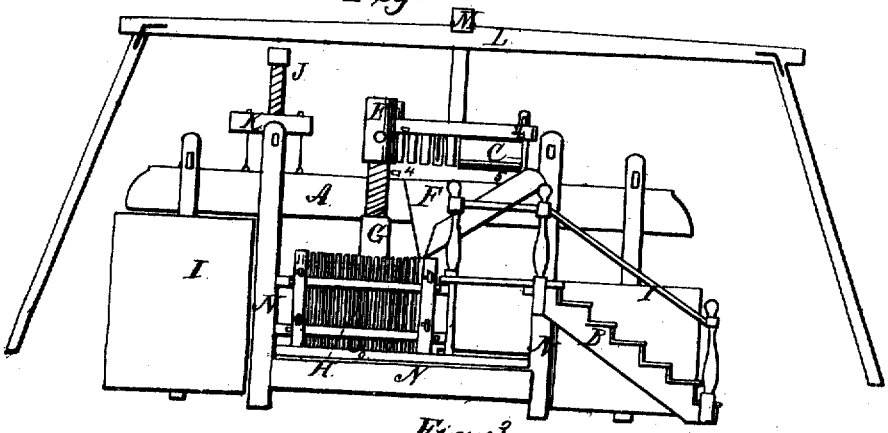
Figure 3:
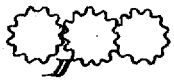
Figure 2:
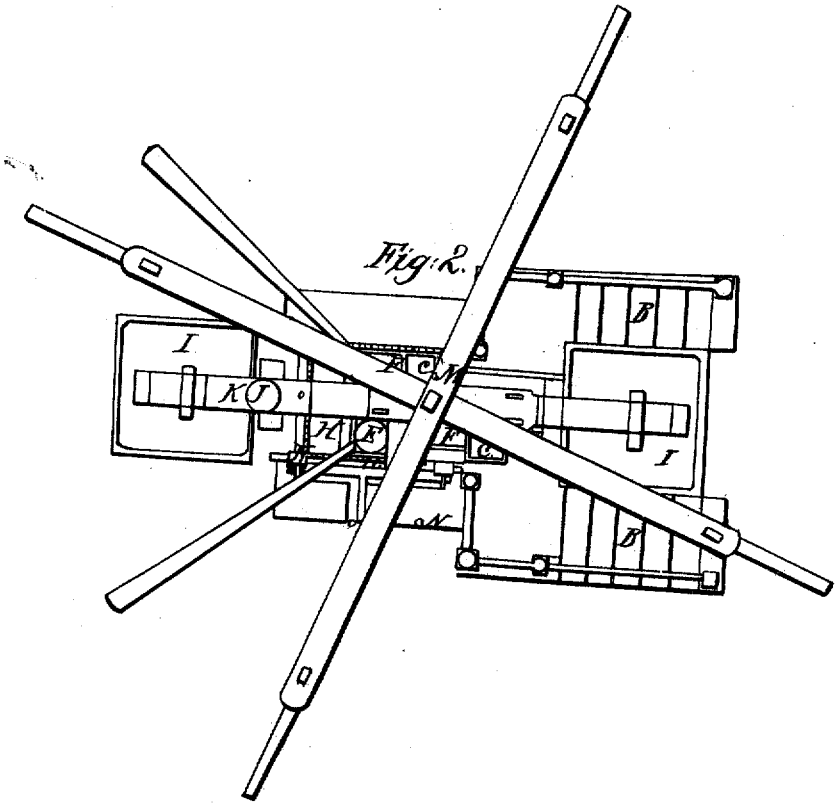

9524X

C. Sheafer,

Cider Mill.

Patented Mar. 19, 1836.

15 9524X

Mar. 19. 1836 459

Christian Sheaffer

The Schedule referred to in these Letters Patent and making part of the same containing a description in the words of the said Christian Sheaffer himself of his improvement in the machine for making Cider. — To all to whom these presents shall come, — Be it known that I, Christian Sheaffer of the township of Lebanon, in the County of Lebanon and State of Pennsylvania have invented a new and very useful improvement in the machine for making cider usually called, Cider press, the following being a full and exact description of the construction and operation of the said machine as invented or improved by me. The machine consists of two pair of stairs, a frame, an apple mill made of three cogwheels, cage or receiver, a press beam, two main screws, one assistant screw (with nut) two weight boxes &c &c. A is the press beam. B is a pair of stairs of which there are two viz one to correspond with it on the other side of the press beam. C is a hopper or rightangled box wherein the apples are thrown of which there are two, viz one on the other side of the mill and placed at the contrary corner, (a pair of the stairs and one of the hoppers or rightangled boxes are seen in the drawing accompanying this specification Fig II). D is the mill and consists as before said, of three cog wheels, part of the one and the whole of another of which are seen in the drawing Fig III, being hid by the hopper or rightangled box C. — E is one of the main screws of which there are two, viz one to correspond with it on the other side of the press beam. F is a spout or conductor. G is a piece of timber, in length the inside of the cage or receiver, wherein are holes fitted to the screws [illegible] may be called nuts, H is the cage or receiver and is made four square or nearly so. II are the two weight boxes which are filled with stones, sand &c. they are hung on the press beam by frames made of timber, one piece on each side of the press beam and one on top (at each box) the side pieces extend thro the boxes and are fastened at the bottom. J is an assistant screw. K is a piece of plank which has a hole fitted to the screw and may be called a nut, to correspond to the assistant screw; it is made firm by two strong wires or bars of iron as seen in the drawing 1, 2, 3, 4 are keys to regulate the mill in case of friction. L is a piece of timber with two end pieces attached to it, at each of which a horse is attached, at M is another piece of timber

9

9524X with end pieces it is at right angles with the other and corresponds with
it. The end pieces attached to the named timber, are not quite as long
as those before named, and are intended for the guiding of the horse
reins. The frame pieces N N N have each of them one to correspond with
it, on the other side of the press beam. The machinery in different
parts is strengthened with Iron to prevent disorder in case of fric-
tion, wear &c. I omitted to say that one of the main Screws is seen in
the drawing Fig 11. that there are two spouts or conductors like F
viz one on the other side of the mill seen in the drawing Fig 11. and
facing the main Screw on that side, and under the hopper or right-
angled box in part — also omitted to say that the weight box at
the Stairs always rests on the ground. The operation is as follows,
the apples are carried up the Stairs on either side, thrown into either
of the hoppers or rightangled boxes viz on either side of the press beam
the horses are then driven round which sets the mill going and mashes
the apples, the apples then tumble into the cage or receiver, when the
cage or receiver is about one eighth full of mashed apples a layer
of straw must then be put in and so alternately until the cage or
receiver is full. the top of the cage or receiver which is in parts, is then put on. A beam
is then laid one end on the platform of the Stairs and the other end on
the cage. this is done on both sides of the Machinery. One man stands
on one of them and another man stands on the other. they then by
means of short poles lighten the main screws, which as before hinted,
pass thro the timber C and rest with their ends on the top of the
cage or receiver; next long poles are put into the holes of the main
Screws and Screws are turned by means of the top part of the Machinery
viz that part to which the horses belong, but finally the main screws
will cause the press beam and the weight box near the assistant Screw
to rise, to prevent too much weight to rest on the main Screws. the assistant
Screw is turned, which then bears part of the burthen. The foregoing
process will cause the juice of the apples, or the cider to run in the box
of the cage or receiver which is so contrived, as to drive the cider to run
into a tub or something else at O. The machinery described by me may be variously modified and arranged, whilst the same general
principles or modes of action as those upon which my instruments are
dependant may be substantially retained, in claiming certain things
as my invention therefore it is to be understood that I do not intend to
limit myself to the precise modes and forms by me set forth but
to vary the same in any way I may deem proper, whilst the same re-
-sults are attained by analogous means. I claim as my invention the
whole of the machinery, excepting what I have named the cage, or receiv
the bed or bases belonging to the cage or receiver, and the manner of mix
-ing the Straw with the ground apples, or rather the mashed apples Christian Shaffer.

Geo. Heim }
Henry Deluff } Witness 47.11.f.

1155 w85]

Drawing